United States Patent
Miyazawa et al.

(10) Patent No.: US 10,268,906 B2
(45) Date of Patent: Apr. 23, 2019

(54) DISTANCE SENSOR WITH DIRECTIONAL PROJECTION BEAMS

(71) Applicant: Magik Eye Inc., New York, NY (US)

(72) Inventors: Takeo Miyazawa, Tokyo (JP); Akiteru Kimura, Tokyo (JP); Tomaso Poggio, Needham, MA (US)

(73) Assignee: Magik Eye Inc., New York, NY (US)

(*) Notice: Subject to any disclaimer, the term of this patent is extended or adjusted under 35 U.S.C. 154(b) by 18 days.

(21) Appl. No.: 14/920,246

(22) Filed: Oct. 22, 2015

(65) Prior Publication Data

US 2016/0117561 A1 Apr. 28, 2016

Related U.S. Application Data

(60) Provisional application No. 62/159,286, filed on May 10, 2015, provisional application No. 62/068,250, filed on Oct. 24, 2014.

(51) Int. Cl.
| | |
|---|---|
| H04N 7/18 | (2006.01) |
| G06K 9/00 | (2006.01) |
| H04N 5/235 | (2006.01) |
| H04N 9/31 | (2006.01) |
| G01B 11/02 | (2006.01) |

(52) U.S. Cl.
CPC ........ *G06K 9/00805* (2013.01); *G01B 11/026* (2013.01); *G06K 9/00791* (2013.01); *H04N 5/2354* (2013.01); *H04N 9/3161* (2013.01); *G06T 2207/10028* (2013.01); *G06T 2207/10052* (2013.01); *G06T 2207/30261* (2013.01)

(58) Field of Classification Search
CPC .................. G06K 9/00805; G06T 2207/10028
USPC .......................................................... 348/169
See application file for complete search history.

(56) References Cited

U.S. PATENT DOCUMENTS

| | | |
|---|---|---|
| 4,914,460 A | 4/1990 | Caimi et al. |
| 5,598,299 A | 1/1997 | Hayakawa |
| 5,730,702 A | 3/1998 | Tanaka et al. |
| 5,980,454 A | 11/1999 | Broome |
| 2003/0071891 A1 | 4/2003 | Geng |
| 2006/0055942 A1 | 3/2006 | Krattiger |
| 2006/0290781 A1 | 12/2006 | Hama |
| 2007/0091174 A1 | 4/2007 | Kochi et al. |

(Continued)

FOREIGN PATENT DOCUMENTS

WO WO 2014-131064 8/2014

OTHER PUBLICATIONS

International Search Report and Written Opinion from corresponding PCT Application PCT/US2015/056883, dated Jan. 13, 2016, pp. 1-19.

(Continued)

*Primary Examiner* — Richard T Torrente
(74) *Attorney, Agent, or Firm* — Tong, Rea, Bentley & Kim, LLC

(57) ABSTRACT

A distance sensor includes an image capturing device positioned to capture an image of a field of view and a first plurality of projection points arranged around a first lens of the image capturing device, wherein each projection point of the first plurality of projection points is configured to emit a plurality of projection beams in different directions within the field of view. Each projection beam of each plurality of projection beams projects a visible pattern of shapes into a space surrounding the distance sensor.

24 Claims, 12 Drawing Sheets

(56) References Cited

U.S. PATENT DOCUMENTS

| | | |
|---|---|---|
| 2007/0206099 A1* | 9/2007 | Matsuo ............. G06K 9/00033 |
| | | 348/208.12 |
| 2008/0128506 A1 | 6/2008 | Tsikos |
| 2010/0149315 A1 | 6/2010 | Qu et al. |
| 2010/0238416 A1* | 9/2010 | Kuwata .................. G03B 21/10 |
| | | 353/69 |
| 2012/0113252 A1 | 5/2012 | Yang et al. |
| 2012/0225718 A1* | 9/2012 | Zhang ................... A63F 13/213 |
| | | 463/31 |
| 2014/0009571 A1 | 1/2014 | Geng |
| 2014/0036096 A1 | 2/2014 | Sterngren |
| 2014/0071239 A1 | 3/2014 | Yokota |
| 2014/0125813 A1 | 5/2014 | Holz |
| 2014/0207326 A1 | 7/2014 | Murphy |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0077764 A1 | 3/2015 | Braker |
| 2015/0171236 A1 | 6/2015 | Murray |
| 2015/0248796 A1 | 9/2015 | Iyer et al. |
| 2015/0268399 A1 | 9/2015 | Futterer |
| 2016/0022374 A1 | 1/2016 | Haider |
| 2016/0128553 A1 | 5/2016 | Geng |
| 2016/0327385 A1 | 11/2016 | Kimura |
| 2016/0334939 A1 | 11/2016 | Dawson et al. |
| 2016/0350594 A1 | 12/2016 | McDonald |
| 2017/0307544 A1 | 10/2017 | Nagata |

OTHER PUBLICATIONS

International Report of Patentability from corresponding PCT Application No. PCT/US2015/056883, dated Feb. 13, 2017, 4 pages.
EP Examination Report mailed in corresponding EP Application No. 15 852 075.9 dated Mar. 3, 2018, 6 pages.

\* cited by examiner

DISTANCE SENSOR WITH DIRECTIONAL PROJECTION BEAMS

CROSS REFERENCE TO RELATED APPLICATIONS

This application claims the benefit of U.S. Provisional Patent Application Ser. No. 62/068,250, filed Oct. 24, 2014 and U.S. Provisional Patent Application Ser. No. 62/159,286, filed May 10, 2015. Both of these applications are herein incorporated by reference in their entireties.

FIELD OF THE DISCLOSURE

The present disclosure relates generally computer vision systems and relates more particularly to sensors for measuring the distance between a vehicle and an object or point in space.

Unmanned vehicles, such as robotic vehicles and drones, typically rely on computer vision systems for obstacle detection and navigation in the surrounding environment. These computer vision systems, in turn, typically rely on various sensors that acquire visual data from the surrounding environment, which the computer vision systems process in order to gather information about the surrounding environment. For instance, data acquired via one or more imaging sensors may be used to determine the distance from the vehicle to a particular object or point in the surrounding environment.

SUMMARY

In one embodiment, a distance sensor includes an image capturing device positioned to capture an image of a field of view and a first plurality of projection points arranged around a first lens of the image capturing device, wherein each projection point of the first plurality of projection points is configured to emit a plurality of projection beams in different directions within the field of view.

In another embodiment, a method for calculating a distance to an object includes projecting a plurality of projection beams from each of a plurality of projection points, wherein the plurality of projection points is arranged around a lens of an image capturing device, and wherein each beam of the plurality of projection beams is directed in a different direction within a field of view, capturing an image of the field of view, wherein the object is visible in the image and a projection patterns generated by the plurality of projection beams is also visible in the image, and calculating the distance to the object using information in the image.

In another embodiment, a computer-readable storage device stores a plurality of instructions which, when executed by a processor, cause the processor to perform operations for calculating a distance to an object. The operations include projecting a plurality of projection beams from each of a plurality of projection points, wherein the plurality of projection points is arranged around a lens of an image capturing device, and wherein each beam of the plurality of projection beams is directed in a different direction within a field of view, capturing an image of the field of view, wherein the object is visible in the image and a projection patterns generated by the plurality of projection beams is also visible in the image, and calculating the distance to the object using information in the image.

In another embodiment, a method for calculating a distance to an object includes projecting a plurality of points of light onto a field of view, from a plurality of projection points, capturing an image of the field of view, wherein the object is visible in the image and a projection pattern formed by the plurality of points of light is also visible in the image, and calculating the distance to the object in accordance with a positional relationship between at least two of the plurality of points of light, wherein the at least two of the plurality of points of light are emitted by at least two different projection points of the plurality of projection points.

In another embodiment, a computer-readable storage device stores a plurality of instructions which, when executed by a processor of a server, cause the processor to perform operations for calculating a distance to an object. The operations include projecting a plurality of points of light onto a field of view, from a plurality of projection points, capturing an image of the field of view, wherein the object is visible in the image and a projection pattern formed by the plurality of points of light is also visible in the image, and calculating the distance to the object in accordance with a positional relationship between at least two of the plurality of points of light, wherein the at least two of the plurality of points of light are emitted by at least two different projection points of the plurality of projection points.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure relates to a distance sensor. Distance sensors may be used in unmanned vehicles in order to help a computer vision system determine the distance from the vehicle to a particular object or point in the surrounding environment. For instance, a distance sensor may project one or more beams of light onto the object or point and then compute the distance according to time of flight (TOF), analysis of the reflected light (e.g., lidar), or other means. Conventional distance sensors of this type tend to be bulky, however, and thus may not be suitable for use in compact vehicles. Moreover, the sensors can be very expensive to manufacture and tend to have a limited field of view. For instance, even using an arrangement of multiple conventional imaging sensors provides a field of view that is less than 360 degrees.

Embodiments of the disclosure provide a compact distance sensor that is economical to manufacture, includes few or no moving parts, and can measure distances in a field of view of up to 360 degrees. In one embodiment, the sensor uses a set of beam splitting means such as an array of diffractive optical elements (DOEs) to generate a plurality of projection points around a wide angle lens. Each of the plurality of projection points emits a plurality of beams into a field of view. From the appearances of the beams, the sensor can measure distances in a 180 degree hemispherical field of view. By mounting two such sensors back-to-back, distances can be measured in a 360 degree field of view. The DOEs make it possible to split a beam generated by a single light source (e.g., laser) into multiple projection beams that are projected onto an object or point in the field of view. However, in other embodiments, beams emitted by multiple light sources are split by the DOEs. The distance from the sensor to the object or point can then be calculated in one cycle of projection and image capture from the multiple projections.

Figure 1A:
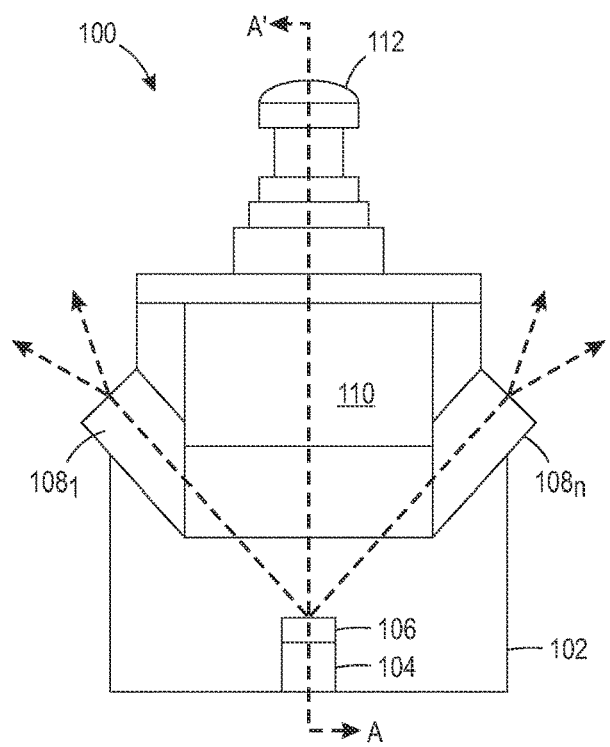
FIG. 1A illustrates a cross-sectional view of one embodiment of a distance sensor of the present disclosure.
Figure 1B:
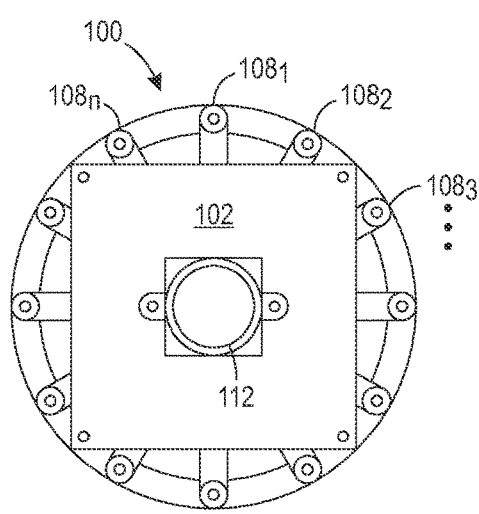
FIG. 1B illustrates a top view of the distance sensor of FIG. 1A.

FIGS. 1A and 1B illustrate one embodiment of a distance sensor 100 of the present disclosure. In particular, FIG. 1A illustrates a cross-sectional view of the distance sensor 100, while FIG. 1B illustrates a top view of the distance sensor 100 of FIG. 1A. The distance sensor 100 may be mounted, for example, to an unmanned vehicle.

As illustrated in FIG. 1A, the distance sensor 100 comprises a plurality of components arranged within a compact housing 102. The components include at least one light source 104, a first beam splitting means, hereinafter referred to as a first diffractive optical element 106, an array of second beam splitting means, hereinafter referred to as second diffractive optical elements $108_1$-$108_n$ (and hereinafter collectively referred to as "second diffractive optical elements 108"), and an imaging sensor 110 including a wide-angle lens 112.

The components are arranged substantially symmetrically about a central axis A-A'. In one embodiment, the central axis A-A' coincides with the optical axis of the imaging sensor 110. In one embodiment, the light source 104 is positioned at a first end of the central axis A-A'. In one embodiment, the light source 104 is a laser light source that emits a single beam of light along the central axis A-A'. Hereinafter, the single beam emitted by the light source 104 may also be referred to as the "primary beam." In one embodiment, the light source 104 emits light of a wavelength that is known to be relatively safe to human vision (e.g., infrared). In a further embodiment, the light source 104 may include circuitry to adjust the intensity of its output. In a further embodiment, the light source 104 may emit light in pulses, so as to mitigate the effects of ambient light on image capture.

The first diffractive optical element (DOE) 106 is positioned along the central axis A-A' in proximity to the light source 104 (e.g., "in front" of the light source 104, relative to the direction in which light emitted by the light source 104 propagates). In particular, the first DOE 106 is positioned to intercept the single beam of light emitted by the light source 104 and to split the single or primary beam into a plurality of secondary beams. In one embodiment, the angles between the central axis A-A' and each of the secondary beams are equal. The first DOE 106 is any optical component that is capable of splitting the primary beam into a plurality of secondary beams that diverge from the primary beam in different directions. For example, in one embodiment, the first DOE 106 may include a conical mirror or holographic film. In this case, the plurality of secondary beams are arranged in a cone shape. In further embodiments, the primary beam may be split by means other than diffraction.

The array of second DOEs 108 is positioned along the central axis A-A' in proximity to the first DOE 106 (e.g., "in front" of the first DOE 106, relative to the direction in which light emitted by the light source 104 propagates). In particular, the array of second DOEs 108 is positioned such that the first DOE 106 is positioned between the light source 104 and the array of second DOEs 108. As more clearly illustrated in FIG. 1B, in one embodiment, the second DOEs 108 are arranged in a ring-shaped array, with the central axis A-A' passing through the center of the ring and the second DOEs 108 spaced at regular intervals around the ring. For instance, in one embodiment, the second DOEs 108 are spaced approximately thirty degrees apart around the ring. In one embodiment, the array of second DOES 108 is positioned "behind" a principal point of the imaging sensor 110 (i.e., the point where the optical axis A-A' intersects the image plane), relative to the direction in which light emitted by the light source 104 propagates.

Each second DOE 108 is positioned to intercept one of the secondary beams produced by the first DOE 106 and to split the secondary beam into a plurality of (e.g., two or more) tertiary beams that are directed away from the second DOE 108 in a radial manner. Thus, each second DOE 108 defines a projection point of the sensor 100 from which a group of projection beams (or tertiary beams) is emitted into the field of view. In one embodiment, each respective plurality of tertiary beams fans out to cover a range of approximately one hundred degrees. The second DOEs 108 are any optical components that are capable of splitting a respective secondary beam into a plurality of tertiary beams that diverge from the secondary beam in different directions. For example, in one embodiment, each second DOE may include a conical mirror or holographic film. In other embodiments, however, the secondary beams are split by a means other than diffraction.

In one embodiment, each plurality of tertiary beams is arranged in a fan or radial pattern, with equal angles between each of the beams. In one embodiment, each of the second DOEs 108 is configured to project tertiary beams that create a different visual pattern on a surface. For example, one second DOE 108 may project a pattern of dots, while another second DOE 108 may project a pattern of lines or x's.

The imaging sensor 110 is positioned along the central axis A'A', in the middle of the array of second DOEs 108 (e.g., at least partially "in front" of the array of second DOEs 108, relative to the direction in which light emitted by the light source 104 propagates). In one embodiment, the imaging sensor 110 is an image capturing device, such as a still or video camera. As discussed above, the imaging sensor 110 includes a wide-angle lens, such as a fisheye lens, that creates a hemispherical field of view. In one embodiment, the imaging sensor 110 includes circuitry for calculating the distance from the distance sensor 100 to an object or point. In another embodiment, the imaging sensor includes a network interface for communicating captured images over a network to a processor, where the processor calculates the distance from the distance sensor 100 to an object or point and then communicates the calculated distance back to the distance sensor 100.

Thus, in one embodiment, the distance sensor 100 uses a single light source (e.g., light source 104) to produce multiple projection points from which sets of projection beams (e.g., comprising patterns of dots or lines) are emitted. The distance from the distance sensor 100 to an object can be calculated from the appearances of the projection beams in the field of view (as discussed in greater detail below). In particular, the use of the first and second DOEs makes it possible to generate a plurality of projection points around the lens, from the single beam of light emitted by the light source. This allows the distance sensor 100 maintain a relatively compact form factor while measuring distance within a wide field of view. The imaging sensor 110 and the light source 104 can also be mounted in the same plane in order to make the design more compact; however, in one embodiment, the second DOEs $108_1$-$108_n$ are positioned behind the principal point of the imaging sensor 110 in order to increase the field of view that can be covered by the projection beams (e.g., such that the depth angle of the field of view is closer to a full 180 degrees, or, in some cases, even greater).

Moreover, since each of the second DOEs 108 projects tertiary beams of a different pattern, the circuitry in the imaging sensor can easily determine which beams in a captured image were created by which of the second DOEs 108. This facilitates the distance calculations, as discussed in greater detail below.

Although the sensor 100 is illustrated as including only a single light source 104 (which reduces the total number of components in the sensor 100), in alternative embodiments, the sensor may include a plurality of light sources. In this case, the first DOE 106 may not be necessary. Instead, in one embodiment, each light source of the plurality of light sources may correspond to one DOE in an array of DOEs (such as the array of second DOEs 108 in FIG. 1A and FIG. 1B). Notably, this configuration still produces a plurality of projection points (e.g., one projection point defined by each DOE in the array) around the imaging sensor's lens and from which sets of projection beams may be emitted.

Figure 2:
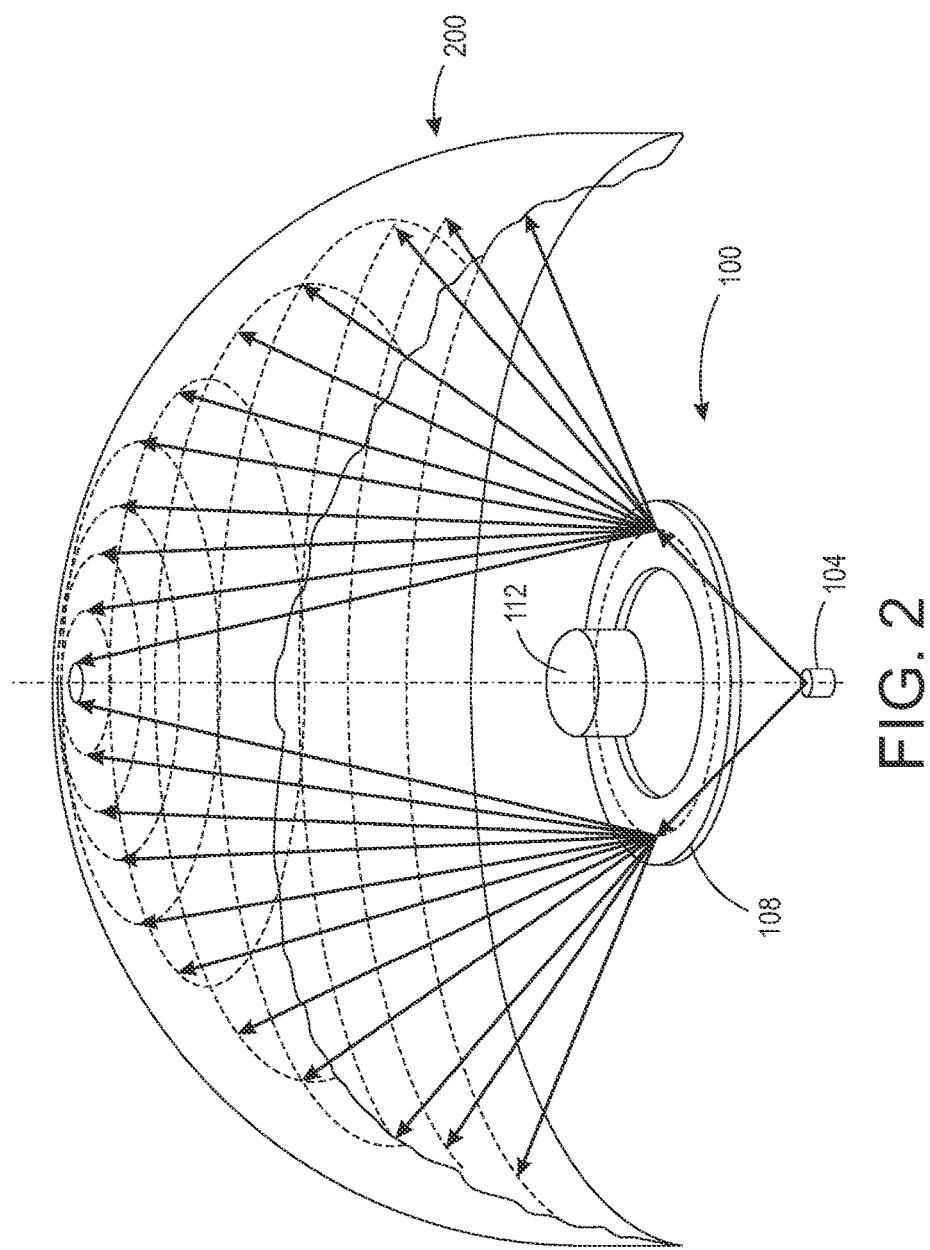
FIG. 2 illustrates an example field of view of the distance sensor of FIGS. 1A and 1B.

FIG. 2 illustrates an example field of view 200 of the distance sensor 100 of FIGS. 1A and 1B. In FIG. 2, certain components of the distance sensor 100 are also illustrated in an exploded view. As shown, the field of view 200 is substantially hemispherical in shape. Furthermore, the plurality of tertiary light beams produced by the distance sensor 100 projects a pattern of light onto the "virtual" hemisphere. The patterns are represented by the series of concentric circles that are illustrated where each tertiary beam meets the hemisphere. The circles are depicted as gradually decreasing in size as the distance from the distance sensor 100 increases, in order to show how the patterns created by the tertiary beams change visually by object distance.

As shown in FIG. 2, the field of view of the distance sensor 100 covers approximately 180 degrees. In one embodiment, the field of view can be expanded to approximately 360 degrees by mounting two distance sensors back-to-back.

Figure 3:
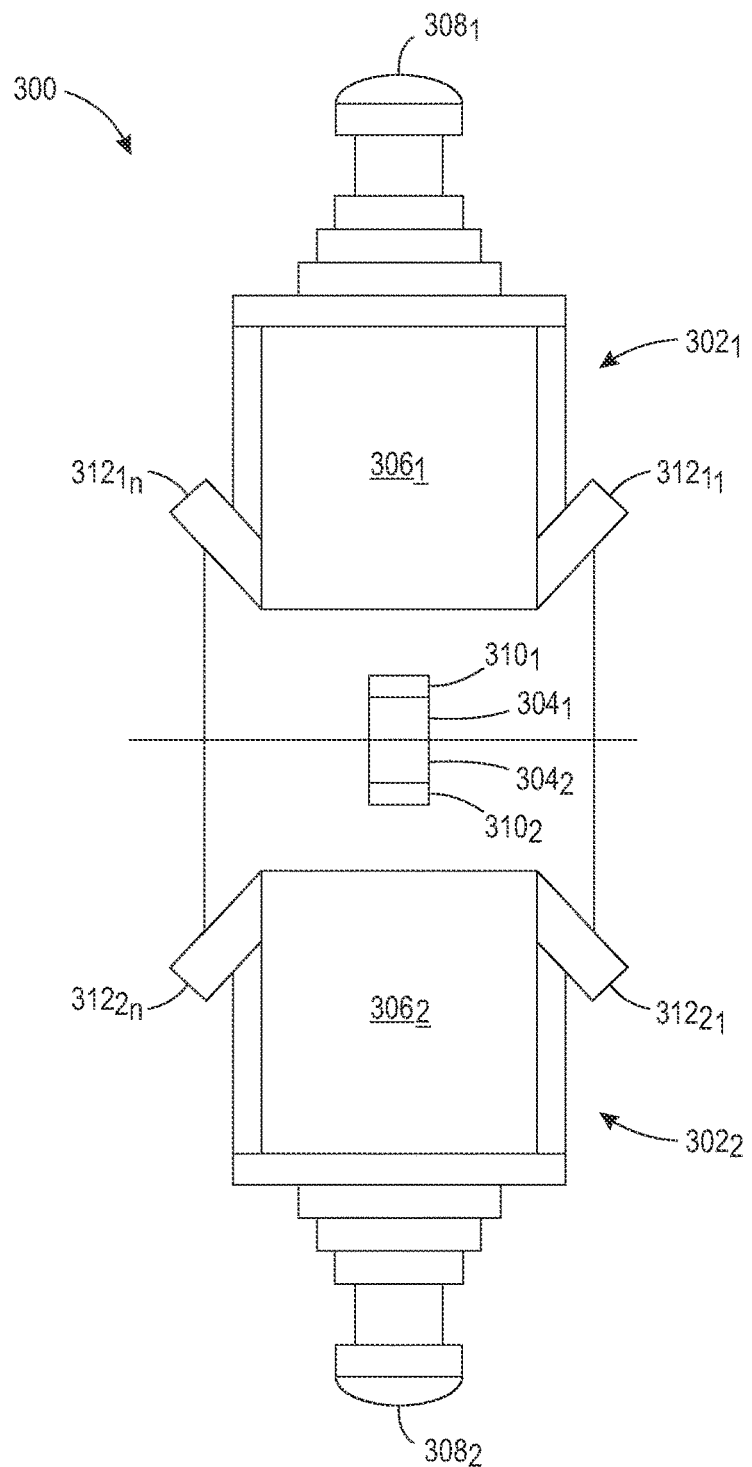
FIG. 3 illustrates one embodiment of a distance sensor having a field of view of approximately 360 degrees.

FIG. 3, for example, illustrates one embodiment of a distance sensor 300 having a field of view of approximately 360 degrees. The distance sensor 300 in fact comprises two distance sensors $302_1$ and $302_2$ that are configured similarly to the distance sensor 100 of FIGS. 1A and 1B, but are mounted in a back-to-back arrangement, i.e., such that the respective light sources $304_1$ and $304_2$ of the two distance sensors $302_1$ and $302_2$ are adjacent, but project their primary beams in opposite directions (i.e., a difference of 180 degrees exists between the two primary beams).

As illustrated, the two distance sensors $302_1$ and $302_2$ may be configured substantially similarly to the distance sensors 100 of FIGS. 1A and 1B. Thus, each distance sensor $302_1$ and $302_2$ includes a respective light source $304_1$ and $304_2$, a respective imaging sensor $306_1$ and $306_2$, a respective wide-angle lens $308_1$ and $308_2$, a respective first DOE $310_1$ and $310_2$, and a respective circular array of second DOEs $312_{11}$-$312_{1n}$ and $312_{21}$-$312_{2n}$. However, the imaging sensors $306_1$ or $306_2$ may share circuitry or a network interface for calculating the distance from the distance sensor 300 to an object or point.

Notably, the second DOEs $312_{11}$-$312_{1n}$ and $312_{21}$-$312_{2n}$ are positioned behind the principal points of their respective imaging sensors $306_1$ and $306_2$ in this embodiment. This relative positioning of the imaging sensors $306_1$ and $306_2$ (and especially the lenses $308_1$ and $308_2$) and second DOEs $312_{11}$-$312_{1n}$ and $312_{21}$-$312_{2n}$ allows the beam patterns projected by the distance sensor 300 to cover a larger field of view (e.g., closer to a full 180 degrees for each distance sensor $302_1$ and $302_2$, or closer to a full 360 degrees for the sensor 300 as a whole).

Figure 4:
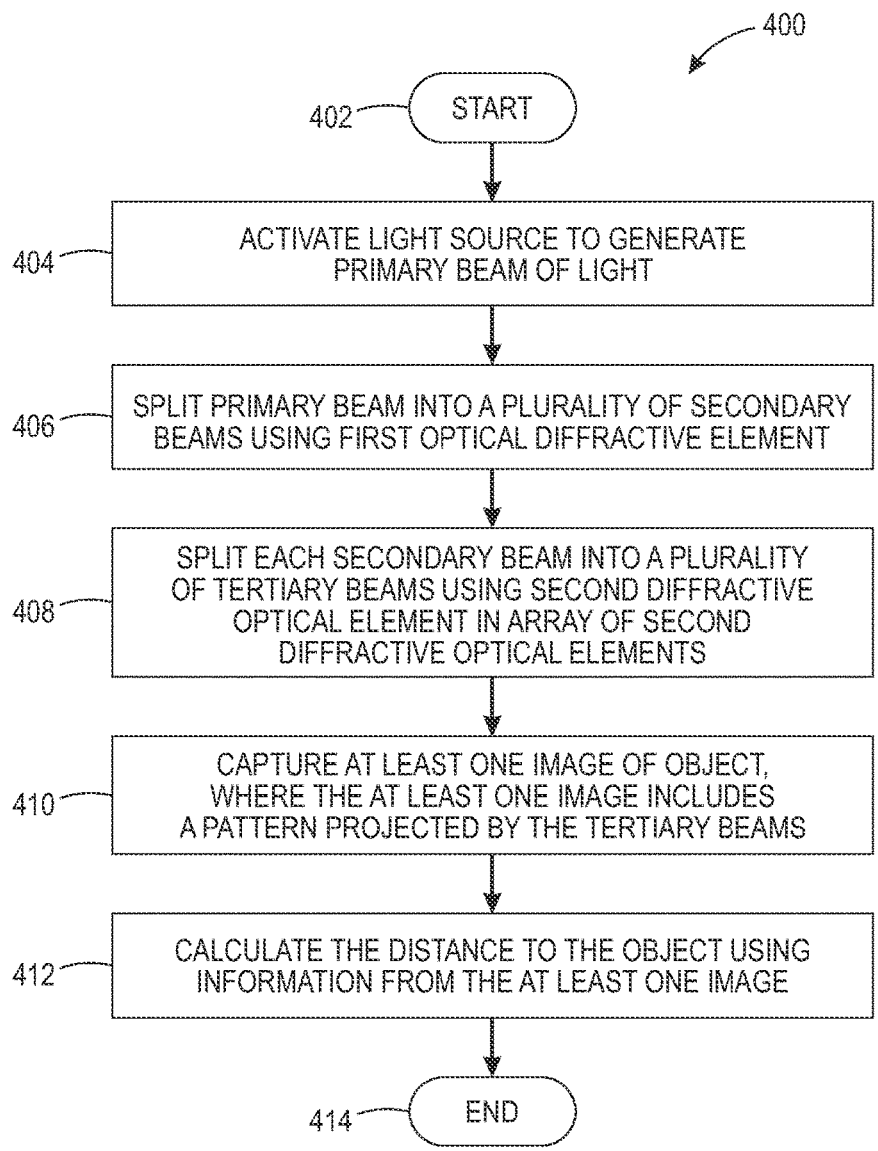
FIG. 4 illustrates a flowchart of a method for calculating the distance from a sensor to an object or point in space.
Figure 5:
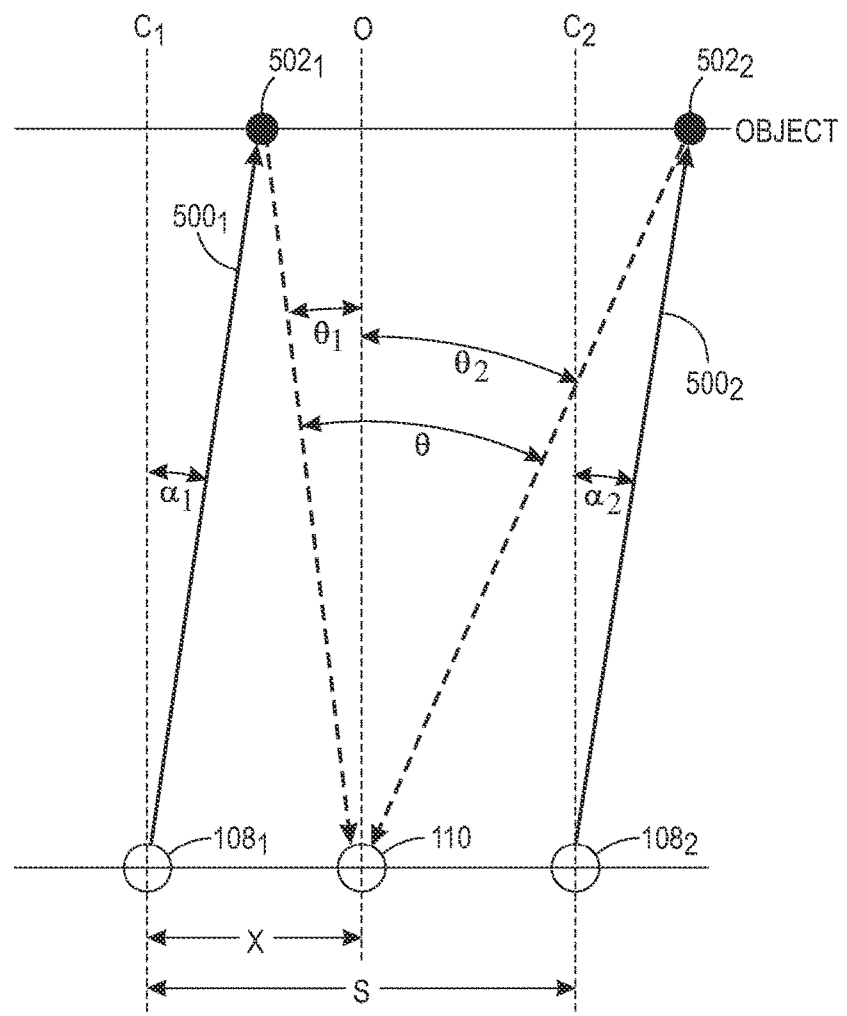
FIG. 5 illustrates a triangulation technique by which the distance from a sensor to an object or point may be calculated.

FIG. 4 illustrates a flowchart of a method 400 for calculating the distance from a sensor to an object or point in space. In one embodiment, the method 400 may be performed by a processor integrated in an imaging sensor (such as the imaging sensor 110 illustrated in FIG. 1A) or a general purpose computing device as illustrated in FIG. 5 and discussed below.

The method 400 begins in step 402. In step 404, a light source is activated to generate a primary beam of light. In one embodiment, a single primary beam is generated by a single light source; however, in other embodiments, multiple primary beams are generated by multiple light sources. In one embodiment, the light source or light sources comprise a laser light source.

In optional step 406, the primary beam is split into a plurality of secondary beams using a first beam splitting means (e.g., a diffractive optical element) that is positioned in the path along which the primary beam propagates. The first beam splitting means may be, for example, a conical mirror. Step 406 is performed, for example, when the distance sensor (of which the imaging sensor is a part) includes only a single light source.

In step 408, each beam in the plurality of secondary beams is split into a plurality of projection or tertiary beams using a second beam splitting means (e.g., second diffractive optical element) in an array of beam splitting means. In one embodiment, a plurality of second beam splitting means are positioned in a ring, such that each second beam splitting means is positioned in the path along which one of the secondary beams propagates. In one embodiment, at least some of the second beam splitting means are conical mirrors. In one embodiment, where the distance sensor comprises a plurality of light sources, the method 400 may proceed directly from step 404 to step 408. In this case, each primary beam of a plurality of primary beams (generated using the plurality of light sources) is directly split into a plurality of projection beams by one of the second beam splitting means.

In step 410, at least one image of the object or point is captured. The image includes a pattern that is projected onto the object or point and onto the surrounding space. The pattern is created by each of the projection beams projecting a series of dots, lines, or other shapes onto the object, point, or surrounding space.

In step 412, the distance from the sensor to the object or point is calculated using information from the images captured in step 410. In one embodiment, a triangulation technique is used to calculate the distance. For example, the positional relationships between parts of the patterns projected by the sensor can be used as the basis for the calculation.

The method 400 ends in step 414. Thus, the method 400, in combination with the sensor depicted in FIGS. 1A-1B or in FIG. 3, can measure the distance from the sensor to an object or point in space in a single cycle of image capture and calculation.

FIG. 5, for example, illustrates a triangulation technique by which the distance from the sensor to the object or point may be calculated in step 412. In particular, FIG. 5 illustrates the example imaging sensor 110 of FIG. 1, as well as two of the projection points, which may be defined by two of the second diffractive optical elements $108_1$ and $108_2$. The projection points are spaced equal distances, x, from the imaging sensor 110, such that there is a distance of s between the two projection points (e.g., x=s/2). Each of the projection points emits a respective projection beam $500_1$ and $500_2$, which is incident upon the object to create a respective point $502_1$ and $502_2$ (e.g., dot or line) in a pattern. These points $502_1$ and $502_2$ are detected by the imaging sensor 110 and may be used to calculate the distance, D, between the imaging sensor 110 and the object as follows:

$$D=s/(-\tan \alpha_2+\tan \alpha_1+\tan \theta_2+\tan \theta_1) \quad \text{(EQN. 1)}$$

where $\alpha_2$ is the angle formed between the projection beam $500_2$ and a central axis $c_2$ of the second diffractive optical element $108_2$, $\alpha_1$ is the angle formed between the projection beam $500_1$ and a central axis $c_1$ of the second diffractive optical element $108_1$, $\theta_2$ is the angle formed between the central optical axis O of the imaging sensor 110 and the angle at which the imaging sensor 110 perceives the point $502_2$ created by the projection beam $500_2$, and $\theta_1$ is the angle formed between the central optical axis O of the imaging sensor 110 and the angle at which the imaging sensor 110 perceives the point $502_1$ created by the projection beam $500_1$.

EQN. 1 is derived from the following relationships:

$$D*\tan \alpha_1+D*\tan \theta_1=x \quad \text{(EQN. 2)}$$

$$D*\tan \alpha_2+D*\tan \theta_2=s-x \quad \text{(EQN. 3)}$$

EQNs. 2 and 3 allow one to calculate the distance from a source of a projection pattern (comprising, e.g., a pattern of dots) to an object onto which the projection pattern is projected. The distance is calculated based on the positional relationship between the points of light (e.g., the dots) that form the projection pattern when the points of light are emitted by different projection points around the source. In this embodiment, the positional relationships between the points of light are known a priori (i.e., not measured as part of the calculation).

Figure 6:
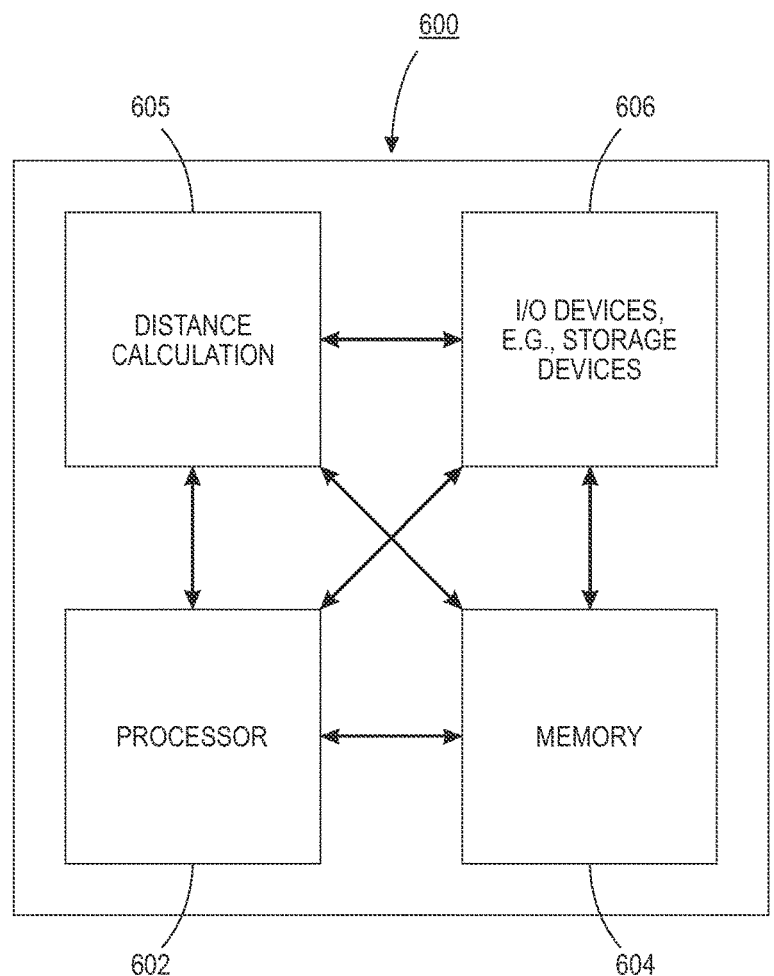
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises one or more hardware processor elements 602 (e.g., a central processing unit (CPU), a microprocessor, or a multi-core processor), a memory 604, e.g., random access memory (RAM) and/or read only memory (ROM), a module 605 for calculating distance, and various input/output devices 606 (e.g., storage devices, including but not limited to, a tape drive, a floppy drive, a hard disk drive or a compact disk drive, a receiver, a transmitter, a lens and optics, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for calculating distance (e.g., a software program comprising computer-executable instructions) can be loaded into memory 604 and executed by hardware processor element 602 to implement the steps, functions or operations as discussed above in connection with the example method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for calculating distance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

As discussed above, the set of projection points, for example as defined by beam splitting means such as diffractive optical elements (DOEs), can be configured to project a variety of patterns onto a field of view. For instance, the shapes of the individual points of light of a projected pattern may vary (e.g., the points of light may comprise dots, lines, etc.). In addition, the individual points of light may collectively form a variety of patterns, including a ring-shaped pattern, a spherical pattern, a pattern of parallel lines or planes, or a triangular pattern, among other potential patterns. In other words, groups of individual points of light can form a line or lines with ordinality (e.g., for projection patternss having spherical or triangular shapes or patterns of parallel lines or planes). In one embodiment, the ordinality between individual points of light is the same or shares similar characteristics (e.g., symmetry, rotational accordance, partial accordance, etc.). Furthermore, groups of individual points of light can form dots with ordinality (e.g., for projection patterns having ring shapes). In one embodiment, the ordinality between individual points of light is the same or shares similar characteristics (e.g., differences in dot shape, interval relationships, etc.).

Figure 7A:
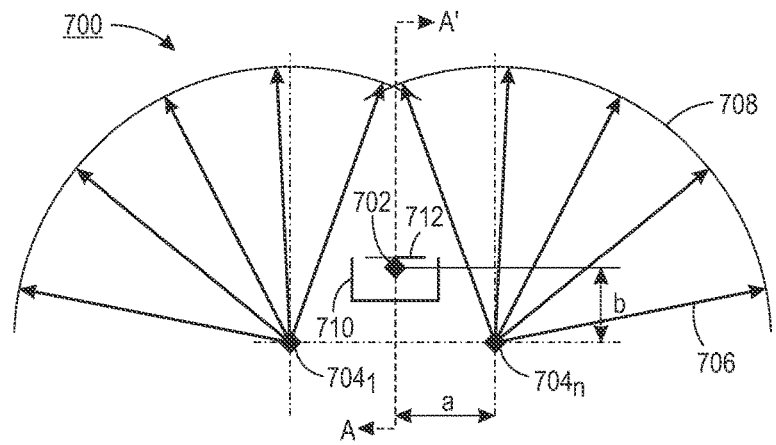
FIG. 7A illustrates one simplified example of a distance sensor that is configured to project ring-shaped patterns.

FIG. 7A illustrates one simplified example of a distance sensor 700 that is configured to project ring-shaped patterns. The optical axis of the distance sensor 700 is indicated by the line A-A' and the principal point 702 of the imaging sensor 710 (i.e., the point where the optical axis A-A' intersects the image plane). In one embodiment, a ring of beam splitting means $704_1$-$704_n$ (hereinafter collectively referred to as "beam splitting means 704") is positioned behind the principal point 702 of the imaging sensor 710. The distance from the optical axis A-A' to each beam splitting means 704 is indicated by "a", whereas the distance from each beam splitting means 704 to the principal point 702 (along the optical axis A-A') is indicated by "b."

As illustrated, each of the beam splitting means 704 emits a plurality of projection beams 706 that extend radially outward in multiple directions from the beam splitting means 704. Collectively, each set of projection beams 706 forms a projection line 708. In the example illustrated in FIG. 7A, the projection line 708 of each set of projection beams 706 resembles at least a portion of a ring.

Figure 7B:
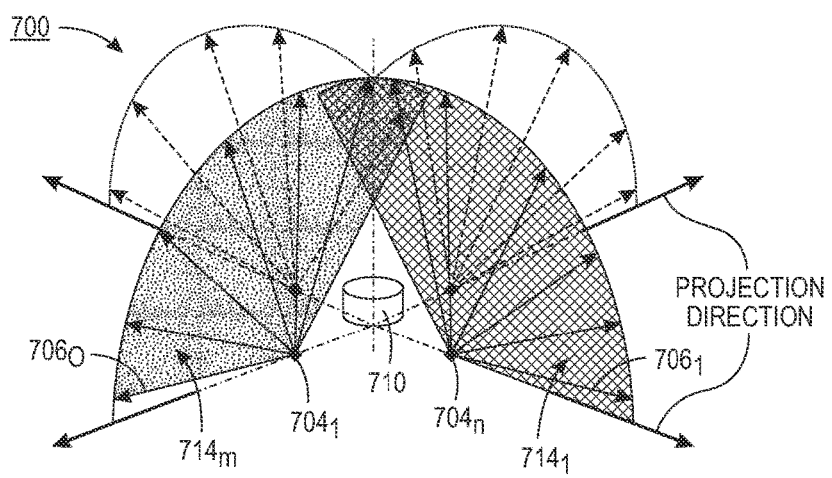
FIG. 7B illustrates a more three-dimensional view of the projection pattern that may be emitted by the distance sensor of FIG. 7A.

FIG. 7B illustrates a more three-dimensional view of the projection pattern that may be emitted by the distance sensor 700 of FIG. 7A. As illustrated, each group of projection beams $706_1$-$706_o$ (hereinafter collectively referred to as "projection beams 706") emitted by a given beam splitting means 704 collectively forms a beam plane $714_1$-$714_m$ (hereinafter collectively referred to as "beam planes 714"). In one embodiment, the projection beams 706 forming a given beam plane 714 are projected in a vertical direction against the beam plane 714. The various beam planes 714 created by different groups of projection beams 706 may overlap as shown. In addition, the visual appearance of each beam plane 714 may vary based on the projection pattern emitted by the associated beam splitting means 704. For instance, the beam plane $714_1$ may appear visually different from the beam plane $714_m$ based on different patterns of points of light created by the respective groups of projection beams.

Figure 7C:
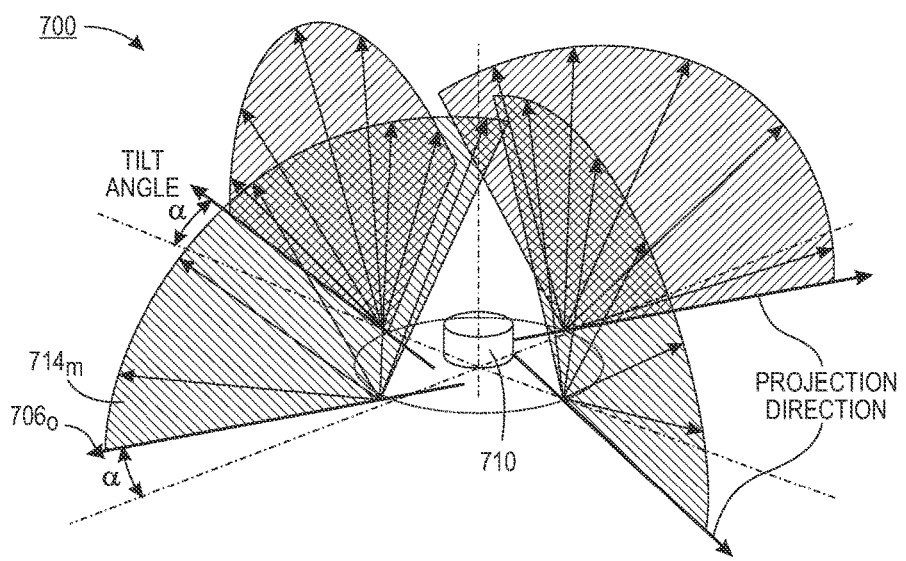
FIG. 7C illustrates another view of the distance sensor of FIG. 7A in which the concept of tilt angle is visible.

FIG. 7C illustrates another view of the distance sensor 700 of FIG. 7A in which the concept of tilt angle is visible. As illustrated, the projection direction of the example beam plane $714_m$ formed by a group of projection beams including the projection beam $706_o$ forms a tilt angle, α, between the beam plane $714_m$ and an axis extending radially from the imaging sensor's principal point. In the illustrated example, tilting the beam planes by the tilt angle α can minimize the overlap of multiple beam planes. Tilting the beam planes can also make it easier to distinguish between individual points of light projected onto a surface, which allows for the distance from the distance sensor 700 to an object to be calculated using a relatively simple algorithm.

Figure 8A:
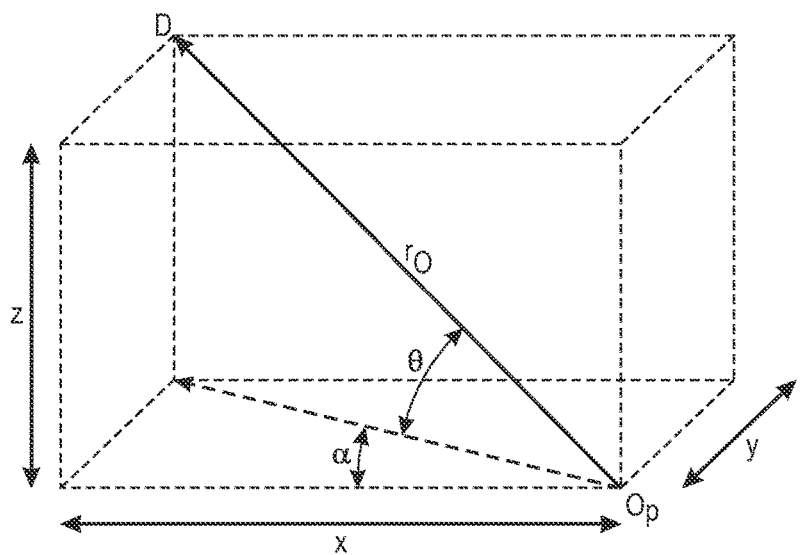
FIGS. 8A and 8B illustrate the concepts from which a simple algorithm for calculating the distance to an object using the sensor of FIGS. 7A-7C can be derived.
Figure 8B:
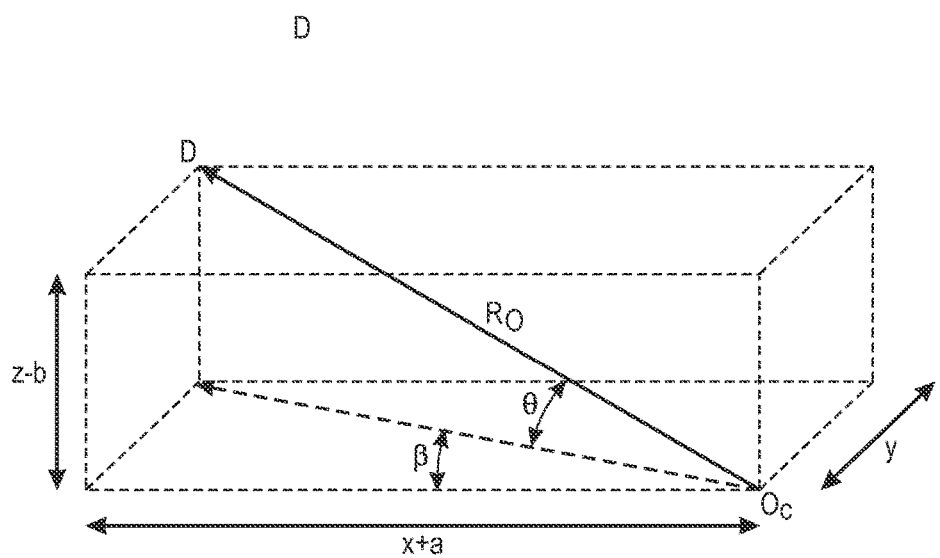

FIGS. 8A and 8B, for instance, illustrate the concepts from which a simple algorithm for calculating the distance to an object using the sensor of FIGS. 7A-7C can be derived. Referring to FIG. 8A, the height z, depth y, and length x of the vector $r_0$ from $O_p$ to D can be computed as follows:

$$z = r_0 \sin \theta \tag{EQN. 4}$$

$$y = r_0 \cos \theta \sin \alpha \tag{EQN. 5}$$

$$x = r_0 \cos \theta \cos \alpha \tag{EQN. 6}$$

Thus, $$r_0^2 = x^2 + y^2 + z^2 \tag{EQN. 7}$$

Referring to FIG. 8B, when the height is decreased by b and the length is increased by a, the dimensions can be computed as:

$$z - b = R_0 \sin \varphi \tag{EQN. 8}$$

$$y = R_0 \cos \varphi \sin \beta \tag{EQN. 9}$$

$$x + a = R_0 \cos \varphi \cos \beta \tag{EQN. 10}$$

Thus, $$R_0^2 = (x+a)^2 + y^2 + (z-b)^2 \tag{EQN. 11}$$

From EQN. 4 and EQN 8, one can derive:

$$R0 \sin \varphi + b = r0 \sin \theta \tag{EQN. 12}$$

From EQN. 5 and EQN 9, one can derive:

$$R_0 \cos \varphi \sin \beta = r_0 \cos \theta \sin \alpha \tag{EQN. 13}$$

From EQN. 6 and EQN 10, one can derive:

$$R_0 \cos \varphi \cos \beta - a = r_0 \cos \theta \cos \alpha \tag{EQN. 14}$$

Thus, $$R_0 = \frac{a \sin \beta + b \cos \theta \cos \alpha}{\cos \varphi \cos \beta \sin \theta - \sin \varphi \cos \theta \cos \alpha} \tag{EQN. 15}$$

β and φ are measured from an image captured by the imaging sensor; a, b, and α are known from the imaging sensor/projection settings; and θ is known from the projection pattern.

Figure 9:
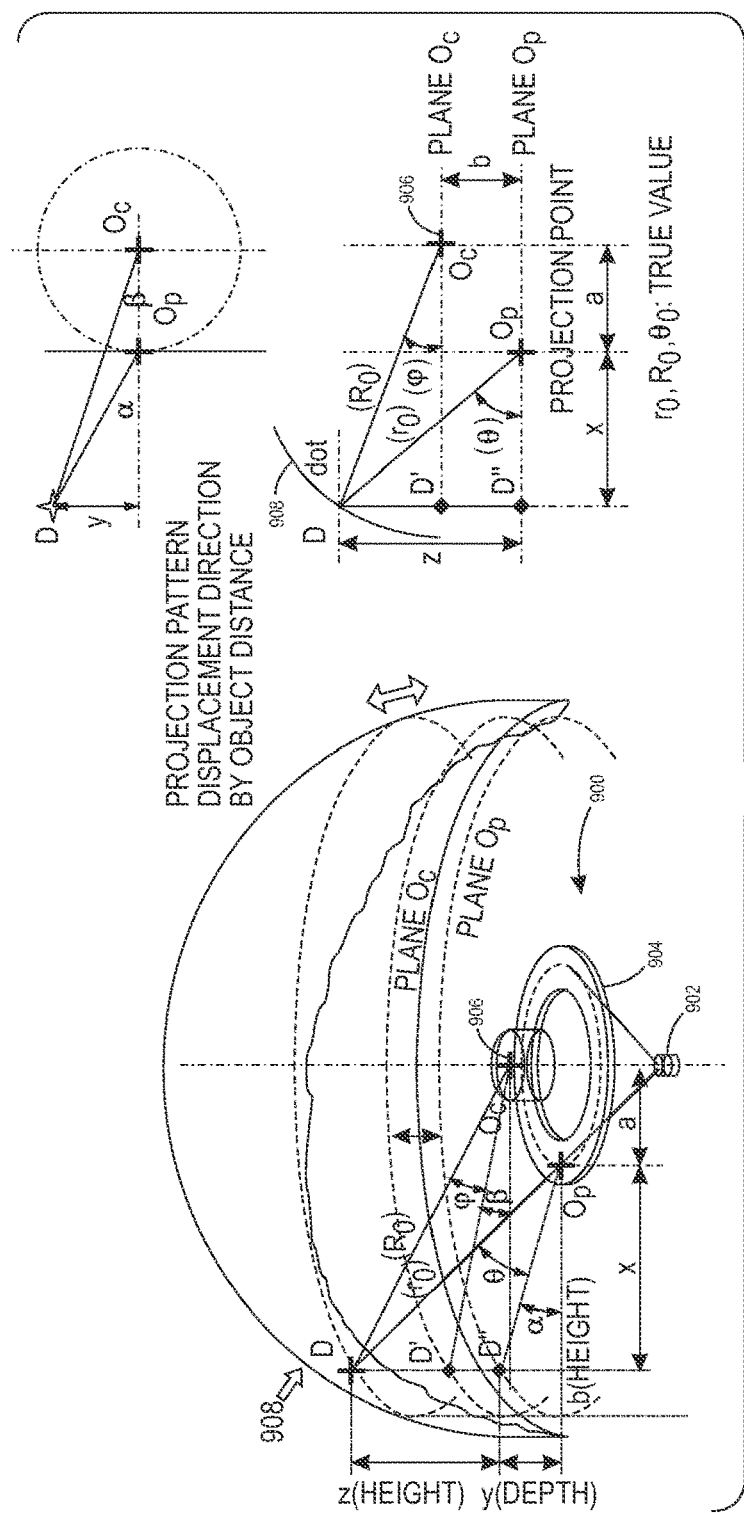
FIG. 9 illustrates the concepts of FIGS. 8A-8B extended to an example distance sensor.

FIG. 9 illustrates the concepts of FIGS. 8A-8B extended to an example distance sensor 900. The example distance sensor 900 includes a light source 902 (including a beam splitting means), a ring-shaped array 904 of second beam splitting means, and an imaging sensor 906 (including a wide-angle lens). The example distance sensor 900 is configured to project a pattern of light that forms a virtual sphere 908.

Figure 10A:
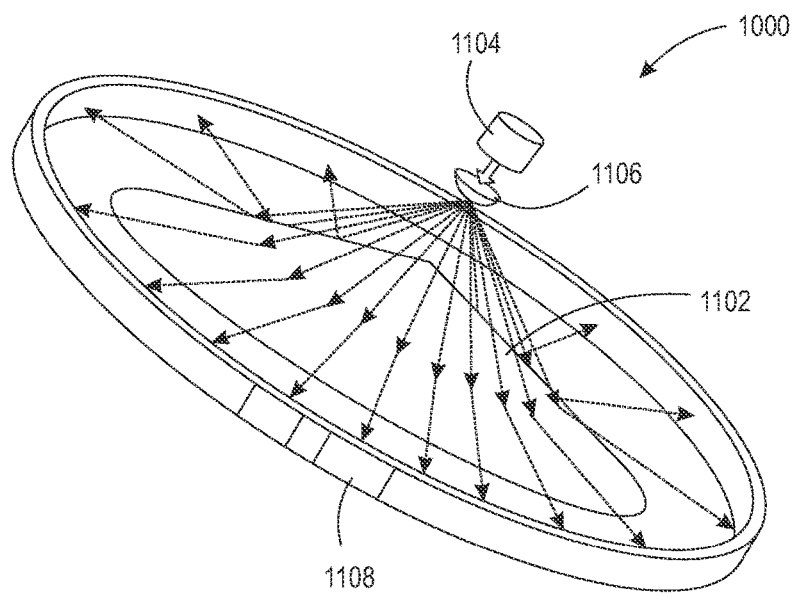
FIGS. 10A and 10B illustrate another embodiment of a distance sensor of the present disclosure.
Figure 10B:
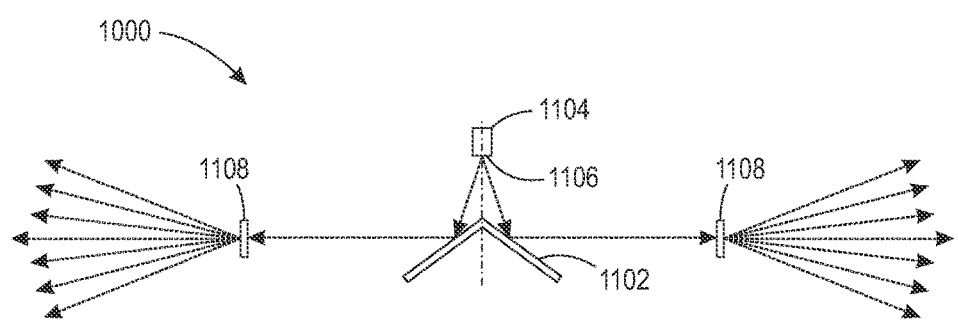

FIGS. 10A and 10B illustrate another embodiment of a distance sensor 1000 of the present disclosure. In particular, FIG. 10A illustrates a simplified exploded view of the distance sensor 1000, while FIG. 10B illustrates a simplified cross-sectional view of the distance sensor 1000 of FIG. 10A.

In particular FIGS. 10A and 10B illustrate only a subset of the components used to produce the projection beams and omit, for example, the imaging sensor and housing. Thus, the distance sensor 1000 generally comprises at least one light source (e.g., a laser light source) 1004, a first beam splitting means 1006, and a second beam splitting means 1008. In one embodiment, the second beam splitting means 1008 comprises a single ring-shaped device, such as a holographic film or other material, having multiple projection points that are capable of splitting individual beams of light into groups of beams. In addition, the distance sensor 1000 includes a conical mirror 1002.

In this case, the first beam splitting means 1006 splits a primary beam emitted by the light source 1004 into a plurality of secondary beams. Each of the secondary beams is then incident upon a surface of the conical mirror 1002, which redirects each of the secondary beams towards the second beam splitting means 1008. Each projection point on the second beam splitting means 1008 splits a secondary beam into a plurality of tertiary or projection beams as described above.

Figure 11A:
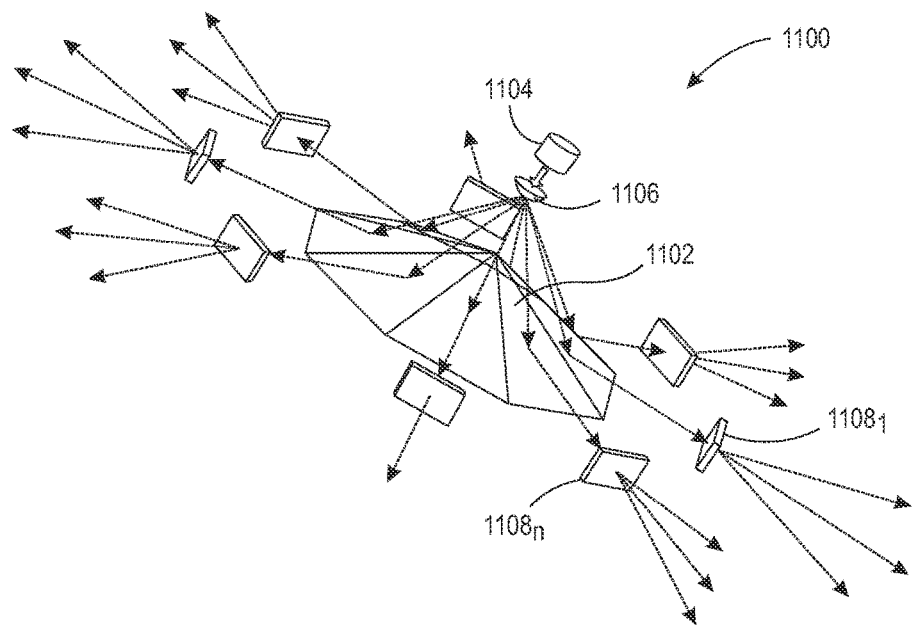
FIGS. 11A and 11B illustrate another embodiment of a distance sensor of the present disclosure.
Figure 11B:
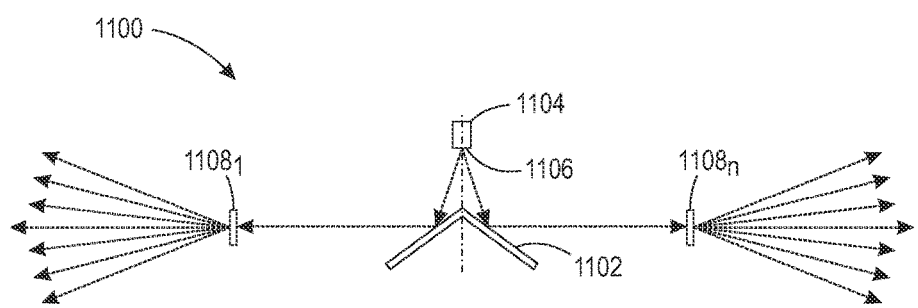

FIGS. 11A and 11B illustrate another embodiment of a distance sensor 1100 of the present disclosure. In particular, FIG. 11A illustrates a simplified exploded view of the distance sensor 1100, while FIG. 11B illustrates a simplified cross-sectional view of the distance sensor 1100 of FIG. 11A.

In particular FIGS. 11A and 11B illustrate only a subset of the components used to produce the projection beams and omit, for example, the imaging sensor and housing. Thus, similar to the distance sensor 1000 illustrated in FIGS. 10A and 10B, the distance sensor 1100 generally comprises at least one light source (e.g., a laser light source) 1104, a first beam splitting means 1106, and an array of second beam splitting means 1108₁-1108ₙ (and hereinafter collectively referred to as "second beam splitting means 1108"). In this case, multiple individual second beam splitting means 1008 are arranged in a ring-shaped array. The array is positioned around the periphery of a pyramidal or multi-faceted mirror 1102.

In this case, the first beam splitting means 1106 splits a primary beam emitted by the light source 1104 into a plurality of secondary beams. Each of the secondary beams is then incident upon a surface of the pyramidal mirror 1102, which redirects each of the secondary beams towards one of the second beam splitting means 1108. Each one of the second beam splitting means 1108 splits a secondary beam into a plurality of tertiary or projection beams as described above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   an image capturing device positioned to capture an image of a field of view;
   a first plurality of projection points arranged around a first lens of the image capturing device;
   a light source configured to emit a single beam of light;
   a beam splitting means positioned to split the single beam of light into a plurality of beams and to direct each beam of the plurality of beams toward one projection point of the first plurality of projection points; and
   a conical mirror positioned between the beam splitting means and the first plurality of projection points;
   a second lens of the image capturing device, wherein the second lens points in a direction that is 180 degrees from a direction in which the first lens points; and
   a second plurality of projection points arranged around the second lens,
   wherein each projection point of the first plurality of projection points is configured to emit a plurality of projection beams in different directions within the field of view,
   wherein each projection point of the second plurality of projection points is configured to emit a plurality of projection beams in different directions within the field of view, and
   wherein each individual projection beam of each plurality of projection beams projects a visible pattern of a series of shapes into a space surrounding the apparatus.

2. The apparatus of claim 1, wherein the plurality of first projection points is positioned behind a principal point of the image capturing device, relative to a direction in which each plurality of projection beams propagates.

3. The apparatus of claim 1, wherein the light source is a laser light source.

4. The apparatus of claim 1, wherein the light source is a pulsed light source.

5. The apparatus of claim 1, wherein the light source includes circuitry to adjust an intensity of the single beam of light.

6. The apparatus of claim 1, wherein the light source is one of a plurality of light sources, and wherein each light source of the plurality of light sources is configured to emit a respective single beam of light and to direct the respective single beam of light toward one projection point of the first plurality of projection points.

7. The apparatus of claim 6, wherein the beam splitting means comprises:
   a plurality of beam splitting means,
   and wherein each projection point of the first plurality of projection points comprises a beam splitting means of the plurality of beam splitting means that is configured to split a respective single beam of light into a respective plurality of projection beams.

8. The apparatus of claim 7, wherein at least one beam splitting means of the plurality of beam splitting means comprises a holographic film.

9. The apparatus of claim 8, wherein the plurality of beam splitting means is arranged in a ring-shaped array.

10. The apparatus of claim 6, wherein the beam splitting means comprises a single ring-shaped device around which the first plurality of projection points is arranged.

11. The apparatus of claim 1, wherein the visible pattern of the series of shapes varies for the plurality of projection beams emitted by each projection point of the first plurality of projection points.

12. The apparatus of claim 1, wherein the first plurality of projection points is arranged to collectively create a spherical pattern with the plurality of projection beams emitted by all projection points of the first plurality of projection points.

13. The apparatus of claim 1, wherein the first plurality of projection points is arranged to collectively create a ring-shaped pattern with the plurality of projection beams emitted by all projection points of the first plurality of projection points.

14. The apparatus of claim 1, wherein the first plurality of projection points is arranged to collectively create a pattern of parallel lines or planes with the plurality of projection beams emitted by all projection points of the first plurality of projection points.

15. The apparatus of claim 1, wherein the first plurality of projection points is arranged to collectively create a triangular pattern with the plurality of projection beams emitted by all projection points of the first plurality of projection points.

16. The apparatus of claim 1, wherein the first lens is a wide-angle lens that renders a hemispherical shape to the field of view.

17. The apparatus of claim 1, further comprising:
circuitry to compute a distance between the apparatus and an object positioned in the field of view, using an image captured by the image capturing device.

18. A method for calculating a distance to an object, the method comprising:
emitting a single beam of light using a light source;
splitting the single beam of light into a plurality of beams by a beam splitting means;
directing, by the beam splitting means, a first subset of the plurality of beams toward a first plurality of projection points, wherein the beam splitting means is positioned between the light source and the first plurality of projection points, and wherein each individual beam of the first subset is directed toward one projection point of the first plurality of projection points;
projecting a plurality of projection beams from each projection point of the first plurality of projection points, wherein the first plurality of projection points is arranged around a first lens of an image capturing device, and wherein each projection beam of the plurality of projection beams is directed in a different direction within a field of view, and wherein each individual projection beam of each plurality of projection beams projects a visible pattern of a series of shapes into a space surrounding the apparatus, and wherein the first plurality of projection points is positioned between the light source and the first lens;
directing, by the beam splitting means, a second subset of the plurality of beams toward a second plurality of projection points, wherein the beam splitting means is positioned between the light source and the second plurality of projection points, and wherein each individual beam of the second subset is directed toward one projection point of the second plurality of projection points;
projecting a plurality of projection beams from each projection point of the second plurality of projection points, wherein the second plurality of projection points is arranged around a second lens of the image capturing device, and wherein each projection beam of the plurality of projection beams is directed in a different direction within the field of view, and wherein each individual projection beam of each plurality of projection beams projects a visible pattern of a series of shapes into a space surrounding the apparatus, and wherein the second plurality of projection points is positioned between the light source and the second lens;
capturing an image of the field of view, wherein the object is visible in the image and a projection pattern collectively generated by multiple projection beams of the plurality of projection beams is also visible in the image; and
calculating the distance to the object using information in the image.

19. The method of claim 18, wherein the light source is one of a plurality of light sources, and wherein each light source of the plurality of light sources emits a respective single beam of light, and wherein each respective single beam of light is directed toward one projection point of the first plurality of projection points.

20. The method of claim 18, wherein the field of view is hemispherical in shape.

21. A computer-readable storage device storing a plurality of instructions which, when executed by a processor, cause the processor to perform operations for calculating a distance to an object, the operations comprising:
emitting a single beam of light using a light source;
splitting the single beam of light into a plurality of beams by a beam splitting means;
directing, by the beam splitting means, a first subset of the plurality of beams toward a first plurality of projection points, wherein the beam splitting means is positioned between the light source and the first plurality of projection points, and wherein each individual beam of the first subset is directed toward one projection point of the first plurality of projection points;
projecting a plurality of projection beams from each projection point of the first plurality of projection points, wherein the first plurality of projection points is arranged around a first lens of an image capturing device, and wherein each projection beam of the plurality of projection beams is directed in a different direction within a field of view, and wherein each individual projection beam of each plurality of projection beams projects a visible pattern of a series of shapes into a space surrounding the apparatus, and wherein the first plurality of projection points is positioned between the light source and the first lens;
directing, by the beam splitting means, a second subset of the plurality of beams toward a second plurality of projection points, wherein the beam splitting means is positioned between the light source and the second plurality of projection points, and wherein each individual beam of the second subset is directed toward one projection point of the second plurality of projection points;
projecting a plurality of projection beams from each projection point of the second plurality of projection points, wherein the second plurality of projection points is arranged around a second lens of the image capturing device, and wherein each projection beam of the plurality of projection beams is directed in a different direction within the field of view, and wherein each individual projection beam of each plurality of projection beams projects a visible pattern of a series of shapes into a space surrounding the apparatus, and wherein the second plurality of projection points is positioned between the light source and the second lens;
capturing an image of the field of view, wherein the object is visible in the image and a projection pattern collectively generated by multiple projection beams of the plurality of projection beams is also visible in the image; and
calculating the distance to the object using information in the image.

22. A method for calculating a distance to an object, the method comprising:
emitting light by a single light source;
splitting the light into a plurality of beams, wherein each beam of the plurality of beams is directed toward one projection point of a set of projection points, wherein the set of projection points includes a first plurality of projection points arranged around a first lens of an image capturing device and a second plurality of projection points arranged around a second lens of the image capturing device that points in a direction that is 180 degrees from a direction in which the first lens points;
projecting a plurality of points of light onto a field of view, from the first plurality of projection points and the second plurality of projection points, wherein the plurality of points of light is generated by the first plurality of projection points and the second plurality of projection points from the plurality of beams, and wherein each projection point of the set of projection points is configured to project a point of light of the plurality of points of light in different directions within the field of view;

capturing an image of the field of view, wherein the object is visible in the image and a projection pattern formed by the plurality of points of light is also visible in the image; and calculating the distance to the object in accordance with a positional relationship between at least two of the plurality of points of light, wherein the at least two of the plurality of points of light are emitted by at least two different projection points of the set of projection points.

23. The method of claim 22, wherein the positional relationship is known a priori.

24. A computer-readable storage device storing a plurality of instructions which, when executed by a processor, cause the processor to perform operations for calculating a distance to an object, the operations comprising:

emitting light by a single light source;

splitting the light into a plurality of beams, wherein each beam of the plurality of beams is directed toward one projection point of a set of projection points, wherein the set of projection points includes a first plurality of projection points arranged around a first lens of an image capturing device and a second plurality of projection points arranged around a second lens of the image capturing device that points in a direction that is 180 degrees from a direction in which the first lens points;

projecting a plurality of points of light onto a field of view, from the first plurality of projection points and the second plurality of projection points, wherein the plurality of points of light is generated by the first plurality of projection points and the second plurality of projection points from the plurality of beams, and wherein each projection point of the set of projection points is configured to project a point of light of the plurality of points of light in different directions within the field of view;

capturing an image of the field of view, wherein the object is visible in the image and a projection pattern formed by the plurality of points of light is also visible in the image; and calculating the distance to the object in accordance with a positional relationship between at least two of the plurality of points of light, wherein the at least two of the plurality of points of light are emitted by at least two different projection points of the set of projection points.

* * * * *